March 7, 1967   P. F. MAGYAR   3,307,251
METHOD OF PRODUCING BALANCED ROTATABLE BODIES
Filed July 6, 1965                                    2 Sheets-Sheet 1

INVENTOR.
Peter F. Magyar
BY
John B Sowell

March 7, 1967   P. F. MAGYAR   3,307,251
METHOD OF PRODUCING BALANCED ROTATABLE BODIES
Filed July 6, 1965   2 Sheets-Sheet 2

INVENTOR.
Peter F. Magyar
BY
John B. Sowell 3,307,251
METHOD OF PRODUCING BALANCED ROTATABLE BODIES
Peter F. Magyar, Warren, Mich., assignor to The Budd Company, Philadelphia, Pa., a corporation of Pennsylvania
Filed July 6, 1965, Ser. No. 469,427
7 Claims. (Cl. 29—406)

This invention relates to a method of producing balanced rotatable bodies having an annular portion and an anchoring web portion, and has for an object the provision of improvements in this art.

The invention has been developed largely in connection with automobile brake drums having a supporting web or head and will be described in this connection although no limitation is intended thereby.

It is a common practice at present to make automobile brake drums by casting an annular drum body on a steel head or disk which is placed in the mold in such position as to have the drum casting anchored to its peripheral edges. The patent of Eksergian 2,066,395 shows a brake drum assembly of the type referred to.

As is well known, it is highly desirable to have all components of automobile wheel assemblies accurately balanced about the axis of rotation, hence the run-out characteristics of each wheel component is closely checked during manufacture.

It frequently happens that the drum-head assemblies after casting are out of balance relative to the center of the head disk. Whether the disk was preformed to have the hub-fitting center opening and concentric group of stud bolt holes therein or whether these positional anchorage holes are formed after casting, it will be obvious that the assembly will be out of balance if the annular drum body is not accurately balanced about the attachment center.

There may be various reasons for this unbalanced condition of the cast assembly. The cope and drag might have been misaligned; the head disk might have shifted in the mold; there may be imperfections due to marred or worn patterns; the sand might have had local soft spots to cause local high spots or bumps to be formed on the outer surface of the drum; or other reasons. Since the outer surface is gripped in a chuck for machining the interior braking surface, it will be evident that the braking surface may be formed about an axis which does not coincide with the attaching center of the head.

In the past it has been usual—when anything at all was done about such unbalanced conditions—to locate the direction and amount of unbalance and to add or remove weight locally to establish a balanced condition. However, this is a troublesome and expensive procedure and is not wholly satisfactory in results.

Accordingly, it is an object of the present invention to provide a routine manufacturing method which will assure the production of balanced articles and which will not add appreciably to the cost of production.

Another object is to provide such an improved method of production which can be practiced with the same equipment which has heretofore been used.

The above and other objects of the invention, as well as various features of novelty and advantages, will be apparent from the following description of an exemplary embodiment, particularly directed to the production of brake drums, considered in connection with the accompanying drawings, in which.

Figure 1:
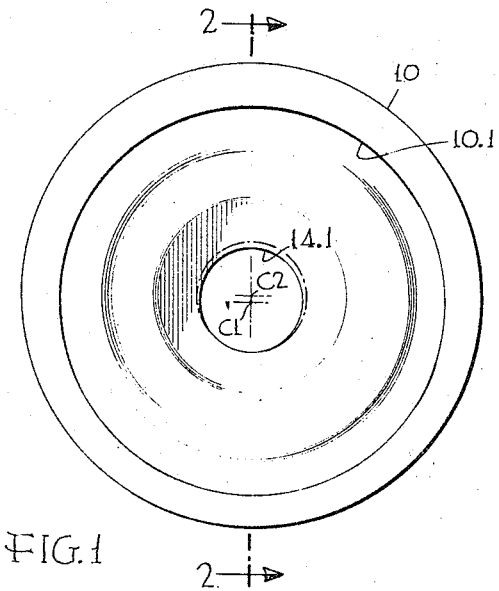
FIG. 1 is an end elevation of a brake drum assembly as taken from a mold, showing an eccentric annular drum formation resulting from imperfect casting conditions, the eccentricity being exaggerated over the minimal trouble-causing condition for illustrative purposes.
Figure 2:
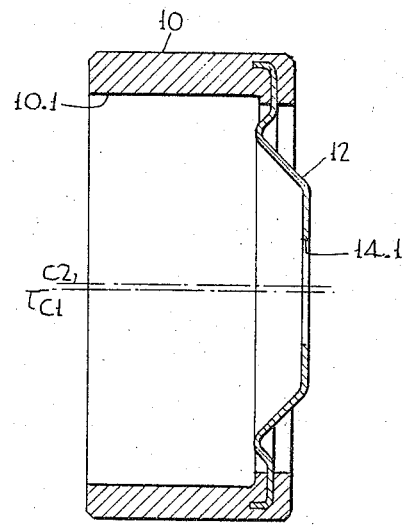
FIG. 2 is a vertical axial section taken on the line 2—2 of FIG. 1.

Referring to FIGS. 1 and 2, the article here shown is a brake drum assembly comprising a drum proper 10 and a head or disk 12 which was preformed by stamping and incorporated into the assembly by being placed in a mold and having the drum cast on and integrated with its outer edges, which were suitably shaped to provide a strong integrated connection.

The intended and initial center of the assembly is designated as C1. A center positioning hole 14 may (or may not) be formed in the disk head prior to casting. If the hole is preformed it will, according to the present invention, be sufficiently undersized to permit the subsequent reshaping and relocating provided hereby. The rough inner surface of the drum is designated as 10.1 but it is not necessarily concentric with the axis C1.

The outer surface of the drum or annular portion 10 is shown to be eccentric relative to the initial axis C1 and to have another axis C2. The axis C2 is the turning center of a chuck which grips the outer periphery of the drum and its location may vary with the amount of eccentricity and peripheral irregularities of the drum. Usually such drums are formed to have a non-finned portion at the rear end above the web for gripping purposes.

The article is first struck on the end disk, as is usual, to iron out such deformations as may have been given to it by the heat encountered during casting.

Figure 3:
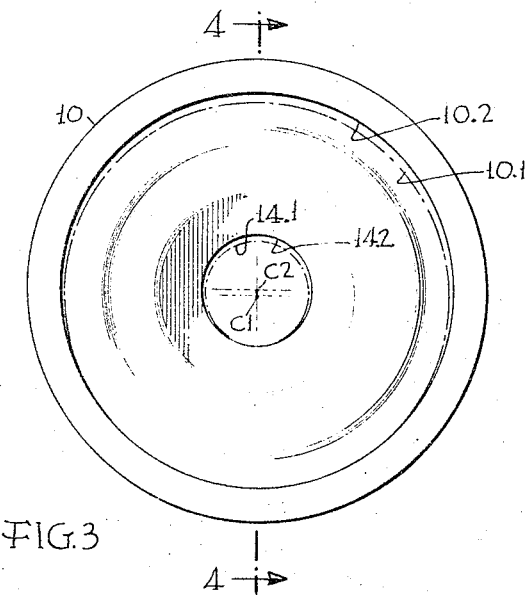
FIG. 3 is an end elevation of the assembly after the inside braking surface has been rough finished with external chucking while machining.
Figure 4:
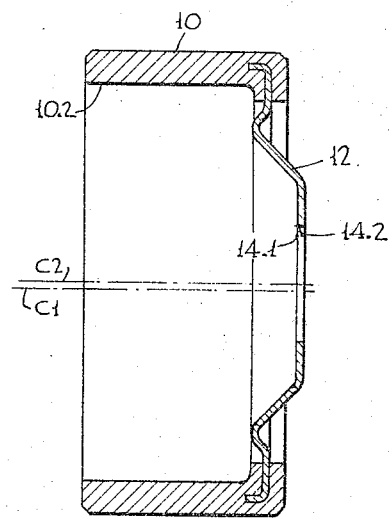
FIG. 4 is a vertical axial section taken on the line 4—4 of FIG. 3.

The drum is chucked on its outer periphery and machine turned about the axis C2 and a rough machining given interiorly to form the braking surface 10.2. This brings the annular portion to a shape which is generally of uniform thickness, as shown in FIGS. 3 and 4. In many cases it is found that even after this turning operation the drum may still have considerable eccentricity.

At this time the center hole, if preformed, may be enlarged somewhat to be concentric with the axis C2. This is indicated by the circle 14.2 in FIG. 3, the broken lines showing the original circle 14.1. If there should be no substantial amount of unbalancing metal to be removed in this step of enlarging and shifting the center hole, this step may be omitted.

Figure 5:
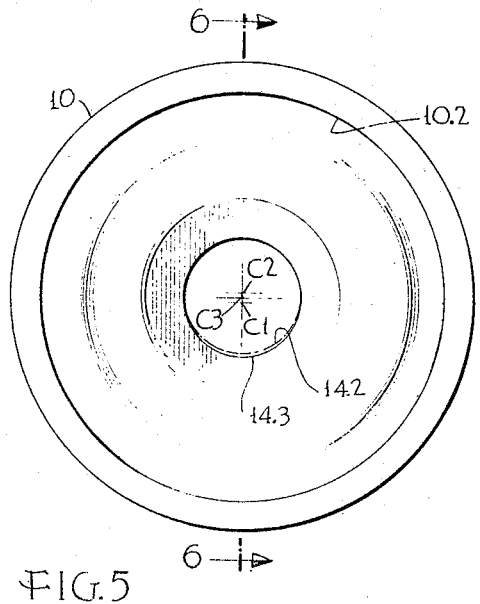
FIG. 5 is an end elevation of the assembly after the relocated positional opening in the head has been formed on an axis established by balancing procedure.
Figure 6:
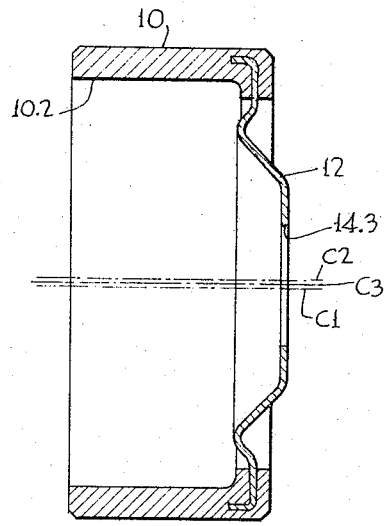
FIG. 6 is vertical axial section taken on the line 6—6 of FIG. 5.

Next, the article is placed on a balancing machine, for example, one known at "Micro-Poise" Precision Static Balancing Machine, and a correctional turning center C3 determined, as indicated in FIGS. 5 and 6. This center is not the balance center but a derived hypothetical center determined from the data of the balancing procedure. The balancing machine provides information as to the direction of unbalance relative to the axis of rough turning and also provides information as to the amount of unbalance by the angle of tilt of the drum on the balancing machine while supported on the rough turning axis.

Labyrinth sealing grooves or ribs and other turned surfaces are rough cut at the same stage as the braking surface and center end hole are machined on the chucking center.

Figure 7:
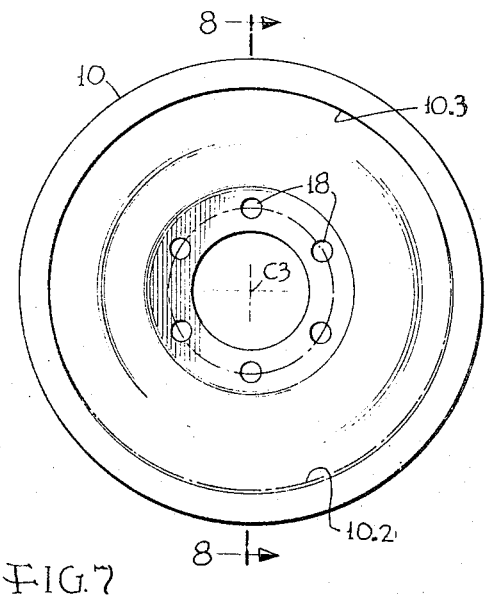
FIG. 7 is an end elevation of the assembly after the stud bolt holes have been formed and the braking surface finished.
Figure 8:
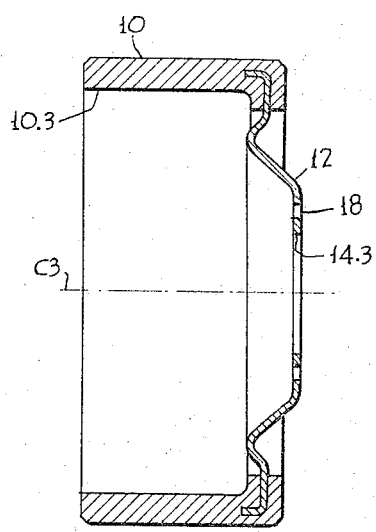
FIG. 8 is a vertical axial section taken on the line 8—8 of FIG. 7.

The center hole is reformed, as 14.3 (or formed, if not previously formed) concentric with the new correctional or hypethetical turning center C3. The article is then secured to turn about this center C3 and the brake surface finished to final shape 10.3, as shown in FIGS. 7 and 8. The reformed center hole 14.3 may be used for centering operations. In the drawings the center C3 is shown to be sufficiently distant from the rough turning center C2 to permit illustration, but actually it may be relatively close to the center C2.

It will be understood by those skilled in the art that with the data from the balancing machine as to the direction and amount of unbalance and by referring to available tables applied to the article concerned, this correctional or hypothetical turning center can be readily determined.

Finally, and while so gripped as to be held concentric with the axis C3, the stud holes 18 are formed on a circle which is concentric with the center C3 and other pertinent surfaces given a final finish.

If the center hole 14 has not been formed previously, it may be formed at the same time as the stud bolt holes 18 are formed, as by a gang punch or a gang drill head, it being possible to hold the workpiece concentric with the center C3 in various known ways, even when the center hole has not been preformed. The bolt holes 18 are shown to have been formed in FIGS. 7 and 8.

It will be seen that the operations provided hereby are simple and inexpensive and performed by the usual tools now employed in manufacturing articles of this kind. The steps of procedure, however, have been judiciously selected to provide an article which has practically perfect balance or run-out characteristics without adding substantially to the cost or production.

While one embodiment of the invention and a few modifications in details have been described for purposes of illustration, it is to be understood that there may be various embodiments and modifications within the general scope of the invention.

I claim:

1. The method of forming a balanced rotatable body having an annular portion and an anchoring web portion, which comprises, gripping the body on its outer periphery and machining the internal surface of the article while turning about the axis established by the external gripping to bring the body into approximately a balanced condition about said first turning axis, balancing the body about said first turning axis to establish the direction and amount of unbalance, locating a correctional second turning axis from the balancing data, and finishing the machined body concentrically to final shape about said correctional turning axis.

2. The method as set forth in claim 1, further characterized by the fact that said finishing action comprises the formation of anchorage means on the web concentric with said correctional turning axis.

3. The method as set forth in claim 1, further characterized by the fact that said finishing action comprises a machining action on said annular portion and the formation of anchorage means on the web concentric with said correctional turning axis.

4. The method of forming a balanced rotatable body having an annular outer portion carried by a supporting web, which comprises, gripping the annular portion on one annular surface and machining the opposite annular surface about an axis established by the gripping action to bring the article into approximate balance about said first turning axis, balancing the article about said first turning axis and from data provided by said balancing procedure establishing a correctional second turning axis, finishing said annular machined surface concentrically with said second turning axis, and providing anchorage elements on said web portion concentrically with said second turning axis.

5. The method of forming a balanced rotatable body having an annular outer portion and an inner disk portion supporting the outer portion, which comprises, gripping the outer periphery of the annular outer portion by a rotatable tool having a first turning axis concentric with its gripping means, performing machining operations on said article while turning about said first turning axis to bring it into approximate balance about said axis, said machining operations including the rough finish of an inner working surface on said annular portion, balancing the article about said first turning axis and from data provided by said balancing procedure establishing a correctional second turning axis, finishing said inner annular working surface concentrically with said second turning axis, and providing anchorage holes in said disk portion concentrically with said second turning axis.

6. The method as set forth in claim 5, further characterized by the fact that a central locational hole is formed in the disk portion concentric with said second turning axis, and that said central hole is used as a locational securement index for performing the other finishing operations.

7. The method as set forth in claim 5, further characterized by the fact that an undersized central opening is initially provided in said disk portion, that said central opening is enlarged to be concentric with said first turning axis, that said central opening is later formed to be concentric with said second turning axis, and that a group of bolt holes is formed in said disk on a circle concentric with said second turning axis while the body is positioned on said central opening.

References Cited by the Examiner

UNITED STATES PATENTS

| | | | |
|---|---|---|---|
| 1,444,172 | 2/1923 | Downie | 29—406 |
| 1,984,718 | 12/1934 | Wistrand | 29—406 X |
| 2,066,395 | 1/1937 | Ekergian | 189—218 |
| 2,080,895 | 5/1937 | Nelson | 29—529 X |
| 3,207,557 | 9/1965 | Hunter | 29—406 X |

JOHN F. CAMPBELL, *Primary Examiner.*

THOMAS H. EAGER, *Examiner.*